No. 838,264. PATENTED DEC. 11, 1906.
W. J. McENTIRE.
DISK CULTIVATOR.
APPLICATION FILED AUG. 9, 1906.
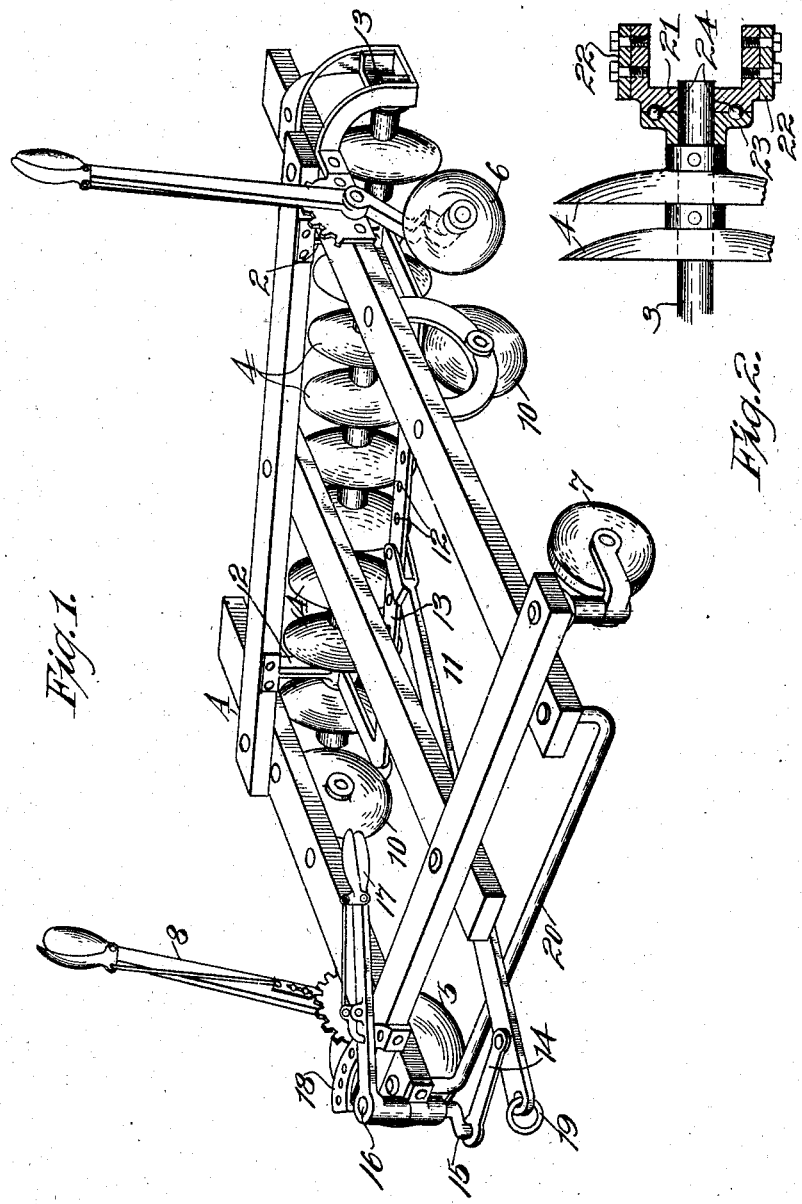
WITNESSES:
Fred E. Maynard
J. H. Truree
INVENTOR
William J. McEntire,
BY
Geo. H. Strong
ATTORNEY

UNITED STATES PATENT OFFICE.

WILLIAM J. McENTIRE, OF NEWMAN, CALIFORNIA.

DISK CULTIVATOR.

No. 838,264.          Specification of Letters Patent.          Patented Dec. 11, 1906.

Application filed August 9, 1906. Serial No. 329,810.

*To all whom it may concern:*

Be it known that I, WILLIAM J. McENTIRE, a citizen of the United States, residing at Newman, in the county of Stanislaus and State of California, have invented new and useful Improvements in Disk Cultivators, of which the following is a specification.

This invention relates to cultivators of the disk type.

While there are many disk cultivators, there are also many which do not work well. For instance, with cultivators employing small disks having two shafts extending across the frame and arranged at an angle with each other and one behind the other there is great difficulty in making the cultivator travel in a straight line. In actual practice such machines have a tendency to swing from side to side with a jerky irregular motion and with correspondingly unsatisfactory results.

The object of the present invention is to provide a cultivator which will avoid the above difficulty and which will be suitable for cultivating purposes, cutting weeds, and the like.

The invention consists of the parts and the construction and combination of parts as hereinafter more fully described and claimed, having reference to the accompanying drawings, in which—

Figure 1 is a perspective view of the cultivator. Fig. 2 is a detail showing the bearing.

A represents a frame of suitable construction, preferably trapezoidal in shape, as here shown, with the parallel sides of the trapezoid arranged in the direction of the line of draft. Journaled underneath the frame on suitable hangers 2 and extending substantially parallel with the longer rear side of the frame and clear across the frame is a continuous shaft 3, on which the small disks 4 are mounted, the angle at which the shaft is set with respect to the line of draft being such as to give the disks the proper pitch in order to turn the soil properly.

The frame is supported at one side on the furrow-wheel 5 and on the other side by the land-wheel 6 and caster-wheel 7. The furrow-wheel 5 is operated, like other wheels of its class, by means of a lever 8 to permit that side of the frame to be raised and lowered. The wheel 6 on the other side of the machine is also connected with a lever 9 for raising and lowering purposes.

The furrow-wheel 5 is pitched at a slight angle, and this wheel operating conjunctively with the colters 10, arranged in front of the plows, keeps the latter to their work, so that the thrust of all the plows or disks, which latter are concaved and all work in one direction, will not push the plows away from the land. The maintenance of the plows with proper relation to the line of draft is also maintained by a special construction of draft-bar and draft-bar connections. This draft-bar is shown at 11 and adapted to be pivoted in one or the other of the holes 12 in a loop-bar 13, which is connected to the frame and is arranged in front of the colters and in substantially the same horizontal plane with the shaft 3. The draft-bar 11 is connected between its ends to a link 14, which latter connects with an arm 15 and a vertical rock-shaft 16. The rock-shaft 16 is operated by a hand-lever 17 and adapted to be held in any suitable position by appropriate pawl-and-rack mechanism 18. The front end of the draft-bar carries a ring or clevis 19 for the attachment of the draft means, the bar being supported and slidable on the cross-piece 20.

The pitch of the plows or disks with respect to the line of draft is regulated according to the class of work to be done by shifting the draft-bar 11 so as to pivot in one or the other of the holes 12 in the cross-piece 13. A still finer adjustment of the plows and a variation in the adjustment while the work is going on and without having to stop the machine is had by means of the lever 17 and its connections with the draft-bar 11. By connecting the draft to a point of the apparatus, as the bar 13, which is substantially on a level with the shaft which carries the disks the pull is brought in line with the center of the disks, which is advantageous.

Inasmuch as there is considerable end thrust on the shaft 3, I provide a thrust-piece 21, which is supported from the frame by arms 22. The shaft is journaled in the thrust-piece and carries a collar 23, which has a ball-race to accommodate the balls 24, which run in a corresponding race in the thrust-piece 21 and form an antifrictional bearing for the collar against the thrust-piece.

Cultivators built in accordance with the foregoing specifications have been made by me and have done very satisfactory work.

Having thus described my invention, what

I claim, and desire to secure by Letters Patent, is—

1. A cultivator comprising a trapezoidal frame supported with its parallel sides arranged in the direction of the line of travel, said frame mounted on wheels, a shaft extending clear across the frame and arranged substantially parallel with the longer inclined side of the frame, disks fixed on said shaft, and adjustable draft connections connected with the frame, said connections including a loop-bar extending in front of the disks and having its ends connected to the frame, a draft-bar having one end adjustably connected to the loop-bar, and means engaging with the front end of the draft-bar for varying the draft adjustment at that end while the machine is in operation.

2. In a cultivator, the combination of a trapezoidal frame mounted on wheels, a shaft extending clear across the frame and arranged substantially parallel with the longer inclined rear side of the frame, disks mounted on said frame, a loop-bar extending across the machine in front of the disks, having its ends fixed to said frame, and a draft-bar adjustably connected with the loop-bar at a point substantially level with the centers of the disks, and means for adjusting the front end of said draft-bar, said means including a vertically-disposed rock-shaft having an operating-lever at one end and having cranked lower end, and a link connection between said cranked end of the shaft and the front end of the draft-bar.

3. In a cultivator, the combination of a wheel-supported frame, a shaft carried thereby and inclined with respect to the line of travel, disks carried by the shaft, an end-thrust ball-bearing support for the rear end of said shaft, said support comprising a thrust-piece supported from the frame and in which piece the end of the shaft is journaled, a collar fixed to the shaft, and an anti-friction-bearing between the thrust-piece and collar, a draft-bar pivotally connected with the frame at a point in substantially the same horizontal plane with said shaft, and means for adjusting the front end of said draft-bar.

4. In a cultivator, the combination of a suitably-supported frame, an inclined shaft journaled therein, and carrying disks, a draft-bar, means including a loop-bar fixed to the frame and extending transversely across the machine in front of the disks for pivotally connecting the rear end of said draft-bar at different points crosswise of the frame and in advance of said disk-shaft, and a lever fulcrumed at the front of the frame and connected with the draft-bar for varying the front end of the latter, and means including a vertical rock-shaft having a cranked lower end and a link connecting said cranked end of the shaft to the draft-bar, for holding said lever at any suitable point.

In testimony whereof I have hereunto set my hand in presence of two subscribing witnesses.

WILLIAM J. McENTIRE.

Witnesses:
W. E. NETHERTON,
E. S. WANGENHEIM.